US012765509B2

(12) United States Patent
Eivaz

(10) Patent No.: US 12,765,509 B2
(45) Date of Patent: Oct. 20, 2026

(54) ELEVATED PET RESTING APPARATUS

(71) Applicant: Ahmad Eivaz, San Marcos, CA (US)

(72) Inventor: Ahmad Eivaz, San Marcos, CA (US)

(73) Assignee: Ahmad Eivaz, San Marcos, CA (US)

( * ) Notice: Subject to any disclaimer, the term of this patent is extended or adjusted under 35 U.S.C. 154(b) by 0 days.

(21) Appl. No.: 19/239,945

(22) Filed: Jun. 17, 2025

(65) Prior Publication Data

US 2025/0380663 A1 Dec. 18, 2025

Related U.S. Application Data

(60) Provisional application No. 63/660,904, filed on Jun. 17, 2024.

(51) Int. Cl.
*A01K 1/03* (2006.01)
*A01K 1/035* (2006.01)

(52) U.S. Cl.
CPC .................................. *A01K 1/0353* (2013.01)

(58) Field of Classification Search
CPC .... A01K 1/035; A01K 1/0353; A01K 15/024; A01K 15/025; A01K 15/0201; A01K 15/0252; A01K 15/0257; A01K 15/0258; A01K 29/00; A01K 29/005; A01K 29/007
See application file for complete search history.

(56) References Cited

U.S. PATENT DOCUMENTS 4,503,981 A * 3/1985 Coronado .............. B43M 99/00 248/447
5,038,716 A * 8/1991 Olson .................. A01K 15/024 119/706
5,799,917 A * 9/1998 Li ........................ F16M 13/022 248/921
6,209,835 B1 * 4/2001 Walrath ................. F16M 11/28 248/276.1
6,431,120 B1 * 8/2002 Feldman .............. A01K 15/025 119/706
6,478,275 B1 * 11/2002 Huang ...................... G09F 3/00 248/278.1
9,888,766 B2 * 2/2018 Chuang ............. F16M 11/2014

* cited by examiner

*Primary Examiner* — Ebony E Evans
(74) *Attorney, Agent, or Firm* — CP Law Group PC Cy Bates; Cy Bates

(57) ABSTRACT

An elevated pet resting apparatus is disclosed that attaches to a table. The apparatus includes a rotatable arm with a proximal end secured to a clamping mechanism and a distal end supporting a nest platform. The rotatable arm is pivotally coupled to the clamping mechanism at a first pivot axis and to the nest platform at a second pivot axis. A first adjustability mechanism at the proximal end allows angular positioning of the arm relative to the table, while a second adjustability mechanism at the distal end adjusts the orientation of the nest platform. The second mechanism counterbalances the first to maintain the platform in a level orientation relative to the table surface. The apparatus is positionable in upright or angled configurations, providing versatile support for pets in compact or shared environments, such as homes or offices, while preserving floor space and offering proximity to the pet owner.

19 Claims, 9 Drawing Sheets

ELEVATED PET RESTING APPARATUS

CROSS-REFERENCE TO RELATED APPLICATIONS

This application claims benefit of priority with U.S. Provisional Application Ser. No. 63/660,904, filed Jun. 17, 2024; the entire contents of which are hereby incorporated by reference.

BACKGROUND

Field of the Invention

This disclosure relates to pet beds, and more particularly to an elevated pet bed having a rotatable arm.

Description of the Related Art

Pet owners often seek practical and comfortable resting areas for their pets, particularly in space-constrained environments such as homes and offices. While traditional pet beds offer comfort, they are typically placed on the floor and can occupy valuable space, contributing to clutter and restricting movement within a room. To address these concerns, alternative designs have emerged, including pet beds that attach to the edges of tables or desks. These elevated designs utilize vertical space and help keep floor areas unobstructed.

For example, U.S. Pat. No. 7,886,693 discloses a pet bed apparatus that attaches securely to the edge of a desk or table. This configuration allows pets to remain near their owners during work or leisure activities, offering both comfort and a sense of companionship. The disclosed apparatus generally uses a clamping or similar mechanism to ensure a stable and safe connection to the furniture.

However, existing table-mounted pet beds often lack adjustability in positioning and orientation. Such limitations may reduce overall comfort and flexibility for both pets and their owners. In particular, fixed attachment mechanisms may not accommodate variations in desk shape or thickness, and minimal orientation options may fail to provide a suitable resting posture for pets of different sizes or behaviors.

SUMMARY

An elevated pet resting apparatus configured to attach to a table is disclosed. The apparatus comprises a rotatable arm having a proximal end and a distal end opposite the proximal end. A clamping mechanism is disposed at the proximal end of the rotatable arm, wherein the rotatable arm is rotatably coupled to the clamping mechanism at a first pivot axis. The clamping mechanism is configured to couple to an edge of the table. A nest platform is disposed at the distal end of the rotatable arm and is rotatably coupled to the rotatable arm at a second pivot axis. A first adjustability mechanism is disposed at the first pivot axis and is configured to adjust an angle between the rotatable arm and the clamping mechanism. A second adjustability mechanism is disposed at the second pivot axis and is configured to adjust an angle between the rotatable arm and the nest platform. The second adjustability mechanism is configured to counteract the first adjustability mechanism such that the nest platform maintains a level orientation relative to a top surface of the table. The elevated pet resting apparatus is configurable in multiple positions, including upright and angled orientations, to accommodate different spatial constraints and pet preferences. This configuration allows pets to remain elevated and close to their owners without occupying floor space, offering improved comfort, convenience, and utility in both home and office environments.

BRIEF DESCRIPTION OF THE DRAWINGS

These and other features of the invention will become apparent to one having the ordinary level of skill in the art upon a thorough review of the following details and descriptions, particularly when reviewed in conjunction with the drawings, wherein.

DETAILED DESCRIPTION OF EMBODIMENTS

Figure 1:
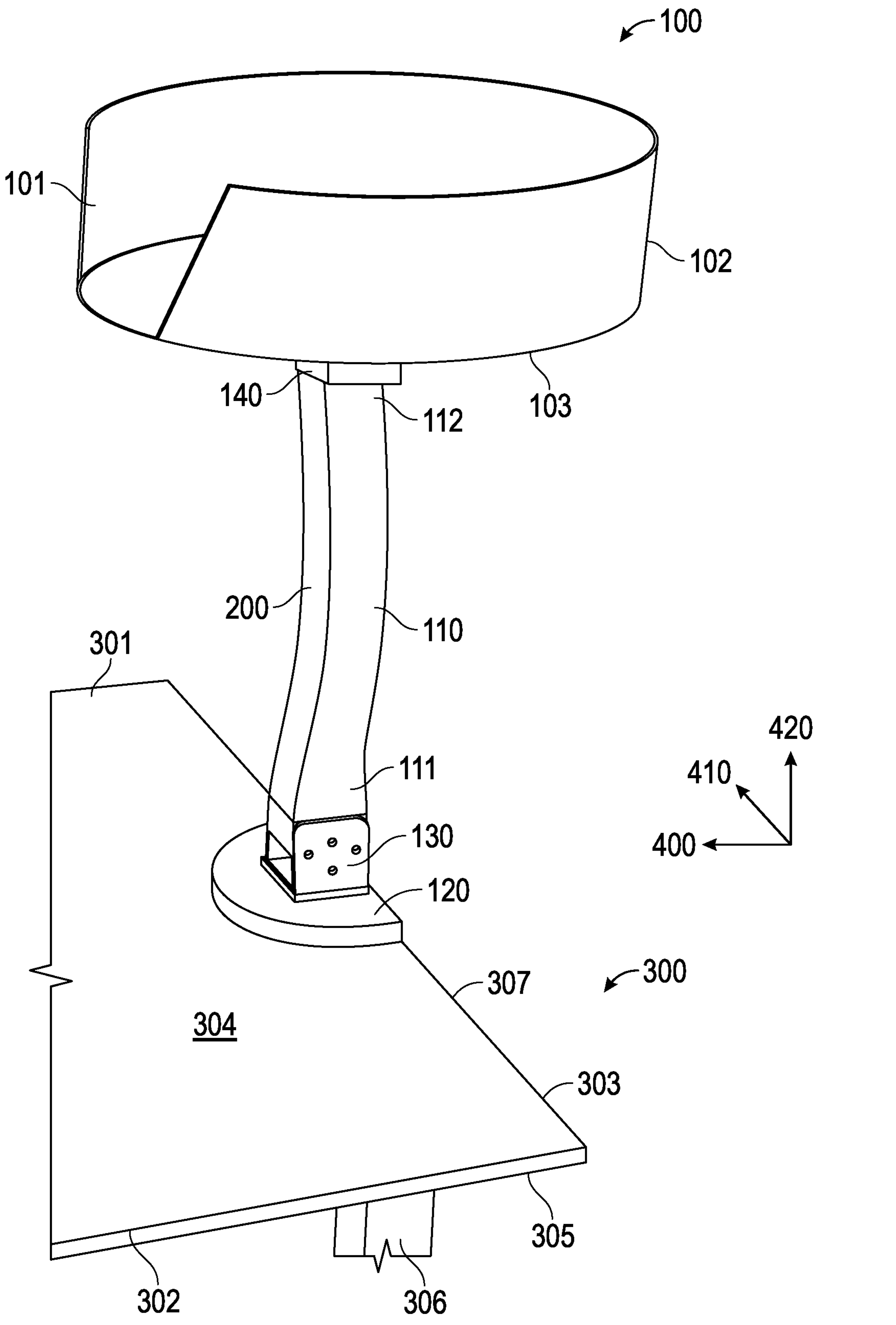
FIG. 1 shows a perspective view of an elevated pet resting apparatus in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, reference numbers are provided in the drawings for illustrating certain features of embodiments. Where distinct figures of the drawings utilize a shared reference number, it can be appreciated that the feature corresponding to the shared reference number is the same or similar, perhaps observed from a different view, or observed with respect to a different embodiment deploying the same or similar feature. For clarity and consistency, similar features in different embodiments of the invention may be identified by the same reference numerals. These common labels indicate that the components serve analogous functions or have similar structures across the various embodiments. It should be emphasized, however, that each embodiment is still described as a distinct implementation of the invention. The use of identical reference numbers does not merge or limit the embodiments to a single scope.

For purposes herein, the term "table" means any furniture with an elevated flat top and one or more legs for support.

The term "engaged edge" means an edge of the table where the clamping mechanism is coupled to.

The term "fixedly coupled" means a rigid coupling where there is no movement between the components.

General Description of Embodiments

In a general embodiment, an elevated pet resting apparatus configured to attach to a table is disclosed. The apparatus comprises a rotatable arm having a proximal end and a distal end opposite the proximal end. A clamping mechanism is disposed at the proximal end of the rotatable arm, and the rotatable arm is rotatably coupled to the clamping mechanism at a first pivot axis. The clamping mechanism is configured to couple to an edge of the table at a top surface and a bottom surface. A nest platform is disposed at the distal end of the rotatable arm and is rotatably coupled to the rotatable arm at a second pivot axis. The nest platform further comprises a raised perimeter extending at least partially around its periphery. A first adjustability mechanism is disposed at the first pivot axis and is configured to adjust an angle between the rotatable arm and the clamping mechanism. The first adjustability mechanism comprises a first pivot bracket, which is rotatably coupled to the rotatable arm and fixedly coupled to the clamping mechanism, wherein the first pivot bracket defines the first pivot axis. A second adjustability mechanism is disposed at the second pivot axis and is configured to adjust an angle between the rotatable arm and the nest platform. The second adjustability mechanism comprises a second pivot bracket, which is rotatably coupled to the rotatable arm and fixedly coupled to the nest platform, wherein the second pivot bracket defines the second pivot axis. The first pivot axis and the second pivot axis comprise a same axis of rotation, and the second adjustability mechanism is configured to counteract the first adjustability mechanism such that the nest platform maintains a level orientation relative to the top surface of the table.

In some embodiments, the first pivot bracket and the second pivot bracket may each comprise a single axis of rotation.

In some embodiments, the clamping mechanism may be configured to fixedly couple to the table.

In some embodiments, the elevated pet resting apparatus is configurable in a plurality of positions, the plurality of positions comprising: an upright position wherein the rotatable arm is orthogonal to the top surface of the table; an outward angled position wherein at least a portion of the nest platform overhangs the table; and an inward angled position wherein the nest platform is positioned above the table.

In some embodiments, in the outward angled position each portion of the nest platform overhangs the table.

In some embodiments, in the inward angled position each portion of the nest platform is positioned over the table.

In some embodiments, in each of the plurality of positions, the nest platform maintains the level orientation with the top surface of the table.

In some embodiments, the rotatable arm may be configured to rotate perpendicular to the edge of the table.

In some embodiments, the first pivot axis may be parallel to the second pivot axis.

In some embodiments, the clamping mechanism may further comprise a clamping bracket configured to engage with the top surface and the edge of the table.

In some embodiments, the clamping mechanism may further comprise a clamping screw, the clamping screw extends through the clamping bracket and is configured to engage with a bottom surface of the table.

In some embodiments, the first adjustability mechanism may allow for a plurality of locked positions between the rotatable arm and the clamping mechanism.

In some embodiments, the first adjustability mechanism may further comprise a first plurality of position apertures and a fastener for selecting one of the plurality of locked positions.

In some embodiments, the first plurality of position apertures forms an arch.

In some embodiments, the second adjustability mechanism may allow for a plurality of locked positions between the rotatable arm and the nest platform.

In some embodiments, the second adjustability mechanism may further comprise a second plurality of position apertures and a fastener for selecting one of the plurality of locked positions.

In some embodiments, the second plurality of position apertures forms an arch.

In some embodiments, the first plurality of position apertures may comprise a same number as the second plurality of position apertures.

In some embodiments, the clamping mechanism may further comprise a support post coupled to the clamping mechanism, the support post configured to extend downward to a terminating end, the terminating end configured to contact a ground surface below the table.

In some embodiments, the support post may be configured to be in parallel alignment with legs of the table.

In some embodiments, the terminating end further may comprise an adjustable foot.

In another general embodiment, an elevated pet resting apparatus configured to attach to a table is disclosed. The apparatus comprises a rotatable arm having a proximal end and a distal end opposite the proximal end. A clamping mechanism is disposed at the proximal end of the rotatable arm, and the rotatable arm is rotatably coupled to the clamping mechanism at a first pivot axis. The clamping mechanism is configured to couple to an edge of the table. A nest platform is disposed at the distal end and is rotatably coupled to the rotatable arm at a second pivot axis. A first adjustability mechanism is disposed at the first pivot axis and is configured to adjust an angle between the rotatable arm and the clamping mechanism. A second adjustability mechanism is disposed at the second pivot axis and is configured to adjust an angle between the rotatable arm and the nest platform. The second adjustability mechanism is configured to counteract the first adjustability mechanism such that the nest platform maintains a level orientation relative to a top surface of the table.

In some embodiments, the first adjustability mechanism may further comprise a first pivot bracket, the first pivot bracket may be rotatably coupled to the rotatable arm and fixedly coupled to the clamping mechanism wherein the first pivot bracket comprises the first pivot axis.

In some embodiments, the second adjustability mechanism may further comprise a second pivot bracket, the second pivot bracket may be rotatably coupled to the rotatable arm and fixedly coupled to the nest platform wherein the second pivot bracket comprises the second pivot axis.

In some embodiments, the first pivot bracket and the second pivot bracket may each comprise a single axis of rotation.

In some embodiments, the nest platform may further comprise a raised perimeter extending at least partially around a periphery of the nest platform.

In some embodiments, the clamping mechanism may be configured to engage the top surface and a bottom surface of the table.

In some embodiments, the clamping mechanism may be configured to fixedly couple to the table.

In some embodiments, the elevated pet resting apparatus may be configurable in a plurality of positions, the plurality of positions comprising: an upright position wherein the rotatable arm is orthogonal to the top surface of the table; an outward angled position wherein at least a portion of the nest platform overhangs the table; and an inward angled position wherein the nest platform is positioned above the table.

In some embodiments, in the outward angled position each portion of the nest platform overhangs the table.

In some embodiments, in the inward angled position each portion of the nest platform is positioned over the table.

In some embodiments, in each of the plurality of positions, the nest platform maintains the level orientation with the top surface of the table.

In some embodiments, the rotatable arm may be configured to rotate perpendicular to the edge of the table.

In some embodiments, the first pivot axis and the second pivot axis may comprise a same axis of rotation.

In some embodiments, the first pivot axis may be parallel to the second pivot axis.

In some embodiments, the clamping mechanism may further comprise a clamping bracket configured to engage with the top surface and the edge of the table.

In some embodiments, the clamping mechanism may further comprise a clamping screw, the clamping screw extends through the clamping bracket and is configured to engage with a bottom surface of the table.

In some embodiments, the first adjustability mechanism may allow for a plurality of locked positions between the rotatable arm and the clamping mechanism.

In some embodiments, the first adjustability mechanism may further comprise a first plurality of position apertures and a fastener for selecting one of the plurality of locked positions.

In some embodiments, the first plurality of position apertures forms an arch.

In some embodiments, the second adjustability mechanism may allow for a plurality of locked positions between the rotatable arm and the nest platform.

In some embodiments, the second adjustability mechanism may further comprise a second plurality of position apertures and a fastener for selecting one of the plurality of locked positions.

In some embodiments, the second plurality of position apertures forms an arch.

In some embodiments, the first plurality of position apertures may comprise a same number as the second plurality of position apertures.

In some embodiments, the clamping mechanism may further comprise a support post coupled to the clamping mechanism, the support post configured to extend downward to a terminating end, the terminating end configured to contact a ground surface below the table.

In some embodiments, the support post may be configured to be in parallel alignment with legs of the table.

In some embodiments, the terminating end may further comprise an adjustable foot.

Illustrated Embodiments

Figure 2:
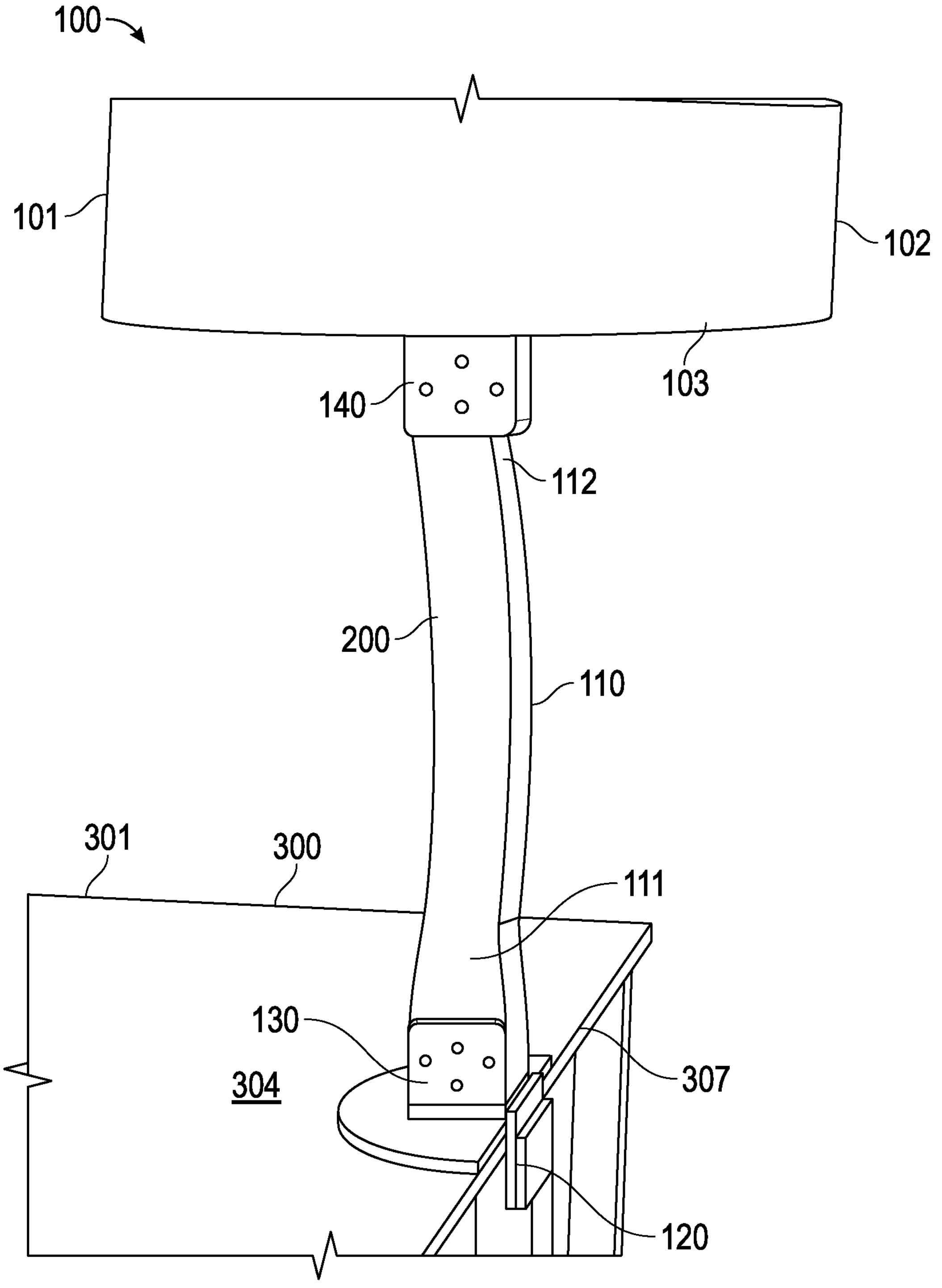
FIG. 2 shows a side view of the elevated pet resting apparatus according to the first illustrated embodiment.

Now turning to the drawings, FIG. 1-2 show an elevated pet resting apparatus (100) in accordance with a first illustrated embodiment. The elevated pet resting apparatus comprises a rotatable arm (110) having a proximal end (111) coupled to a table (300) and a distal end (112) opposite the proximal end coupled to a nest platform (101). The rotatable arm is rotatably coupled to a first pivot bracket (130) at the proximal end. The first pivot bracket is fixedly coupled to a clamping mechanism (120) wherein the clamping mechanism is fixedly coupled to a tabletop (301) of the table at a lateral side (303) thereof by engaging with both a top surface (304) and a bottom surface (305) of the tabletop. Alternatively, the elevated pet resting apparatus may be coupled to a longitudinal side (302) of the tabletop. The distal end of the rotatable arm is rotatably coupled to a second pivot bracket (140) wherein the second pivot bracket is fixedly coupled to a bottom side (103) of the nest platform. The nest platform further comprises a raised perimeter (102) extending at least partially around a periphery of the nest platform where a pet can sit and rest.

The elevated pet resting apparatus (100) is coupled to the table (300) having the longitudinal side (302) extending along a longitudinal axis (400) and the lateral side (303) extending along a lateral axis (410). The rotatable arm (110) comprises an upright position (200) extending substantially upwards along a vertical axis (420) characterized as being orthogonal to the table. The rotatable arm is configured to rotate both at the table and the nest platform (101) via the first pivot bracket (130) and the second pivot bracket (140), respectively. The elevated pet resting apparatus is configurable into additional positions relative to the table beyond the upright position by adjusting the first pivot bracket. These additional positions include an outward angled position and an inward angled position. The outward angled position is formed by the rotatable arm pivoting away from the table perpendicular to the lateral side and parallel to the longitudinal side along the longitudinal axis. The inward angled position is formed by pivoting over the table perpendicular to the lateral side and parallel to the longitudinal side along the longitudinal axis. Generally, for rectangular tables, the rotatable arm rotates perpendicular to an engaged edge (307). The clamping mechanism can be angled relative to the table such that the rotatable arm rotates at an angle relative to the engaged edge.

To maintain a level surface for the nest platform (101), the second pivot bracket (140) can rotate an equivalent amount to the first pivot bracket (130) such that the nest platform remains level with a ground surface while the rotatable arm (110) is in the outward or inward angled positions. As shown, both the first pivot bracket and the second pivot bracket are configured to rotate, or pivot, along a single axis of rotation. In other embodiments, the rotatable arm is configured for additional axes of rotation including about the vertical axis at the proximal end, the distal end, or both.

Figure 3:
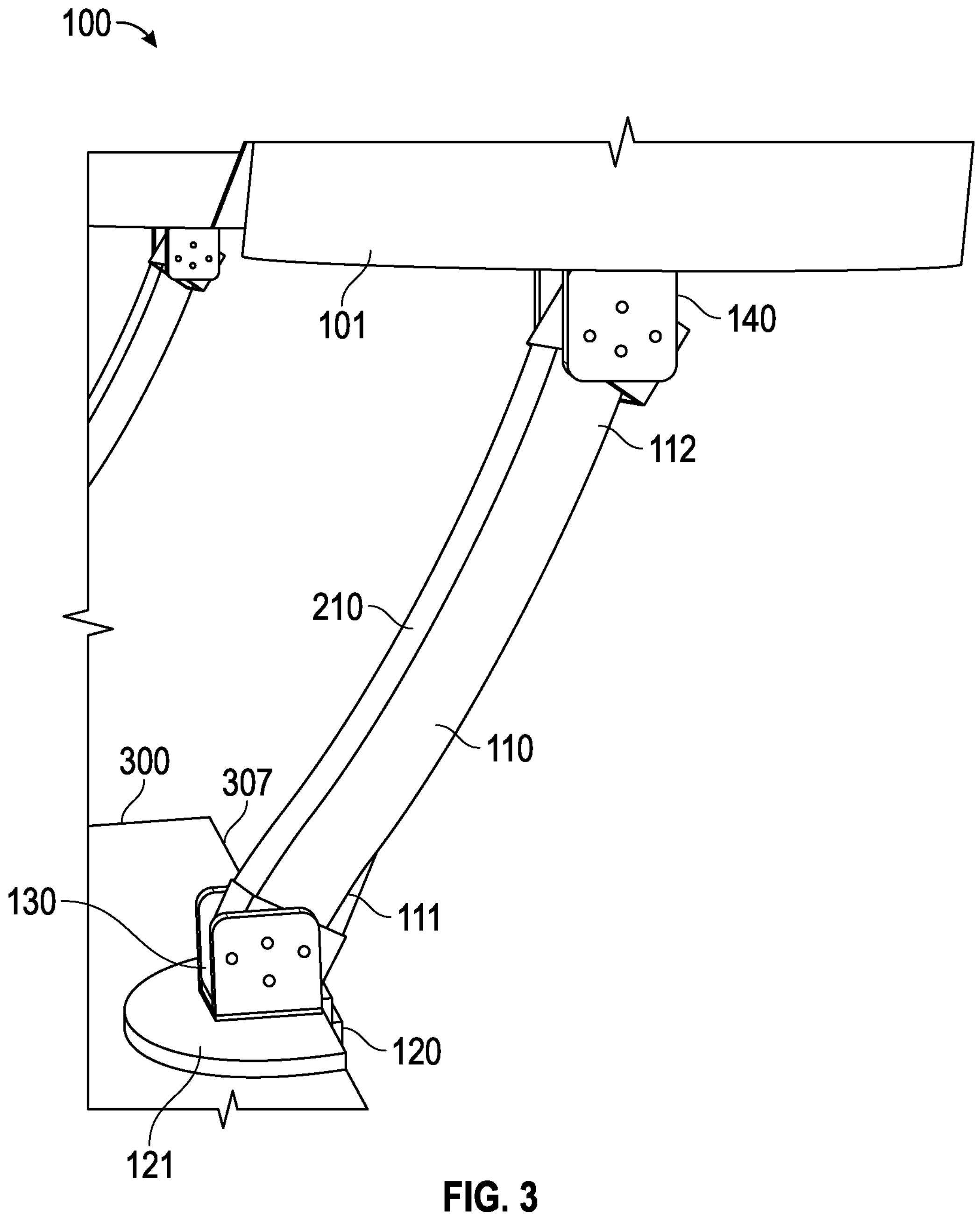
FIG. 3 shows a side view of a rotatable arm of the elevated pet resting apparatus according to the first illustrated embodiment.

FIG. 3 shows a side view of the rotatable arm (110) of the elevated pet resting apparatus (100) according to the first illustrated embodiment. The rotatable arm comprises an outward angled position (210) where the rotatable arm forms an acute angle with the engaged edge (307). One having skill in the art will appreciate that an inward angled position will form an obtuse angle with the rotatable arm and the engaged edge.

The rotatable arm (110) is configured to rotate about the table (300) via the first pivot bracket (130). Furthermore, the rotatable arm is configured to rotate about the nest platform (101) via the second pivot bracket (140). It will be appreciated that from an alternative frame of reference the nest platform is also configured to rotate about the rotatable arm. The first pivot bracket is fixedly coupled to the clamping mechanism (120) wherein the clamping mechanism comprises a clamping bracket (121) configured to abut with the top surface (304) and the engaged edge (307) of the table. Similarly, the second pivot bracket is fixedly coupled to the nest platform.

Figure 4B:
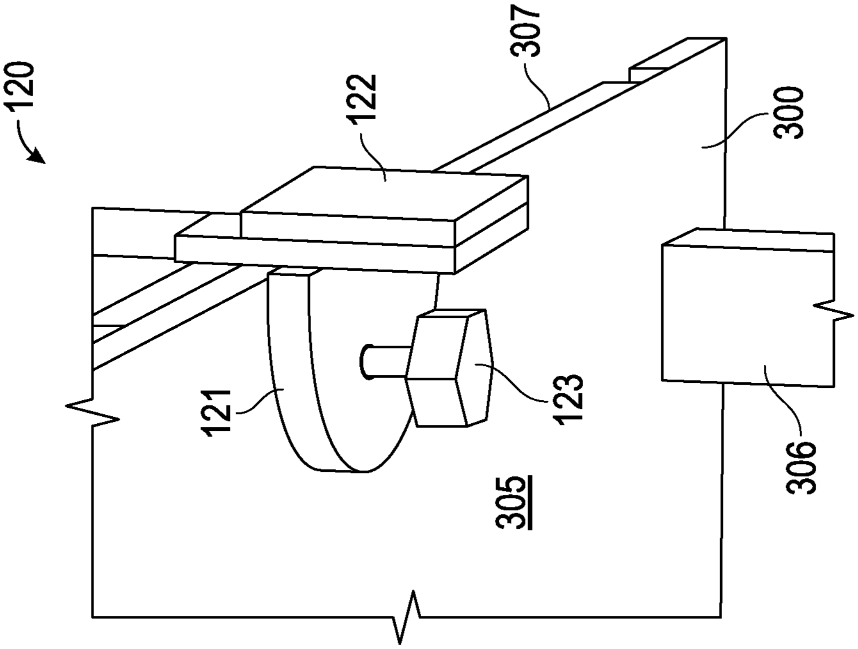
FIG. 4B shows an enlarged view of the clamping mechanism according to the first illustrated embodiment.
Figure 4A:
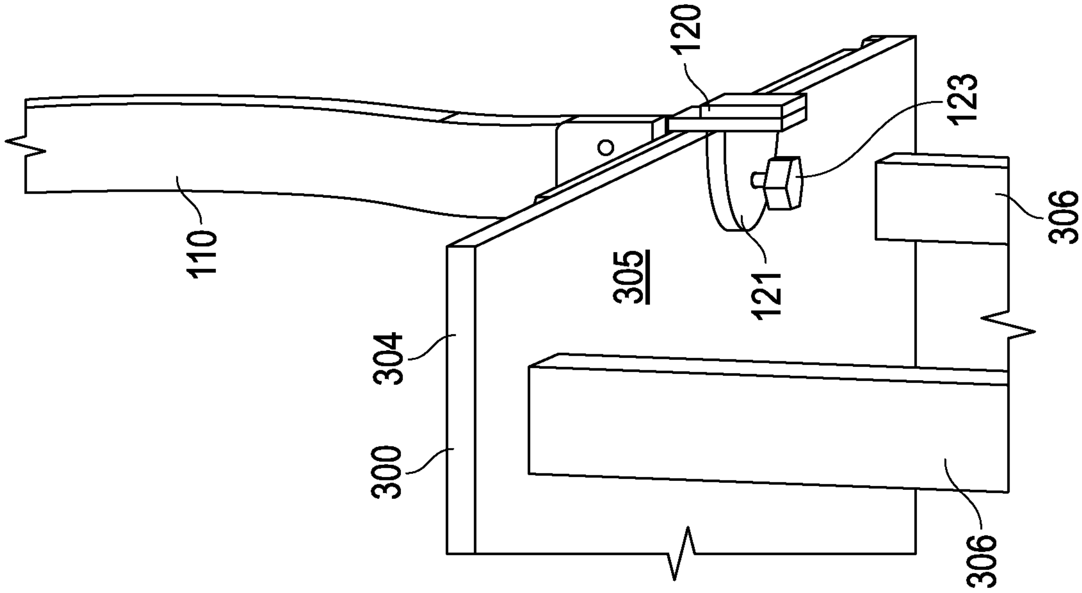
FIG. 4A shows a bottom perspective view of a clamping mechanism of the elevated pet resting apparatus according to the first illustrated embodiment.

FIG. 4A-4B show the clamping mechanism (120) of the elevated pet resting apparatus (100) according to the first illustrated embodiment. The clamping mechanism comprises a clamping bracket (121), a clamping screw (123), and one or more clamping spacers (122). The clamping bracket is configured to contact the top surface (304) of the table (300) as well as the engaged edge (307). The clamping screw extends through the clamping bracket at an underside of the table. The clamping screw can be fastened to contact the bottom surface (305) of the table to provide anchor points at both the top surface and the bottom surface of the table. For thinner tables, the clamp spacers may be used to fill the resulting gaps.

Figure 5A:
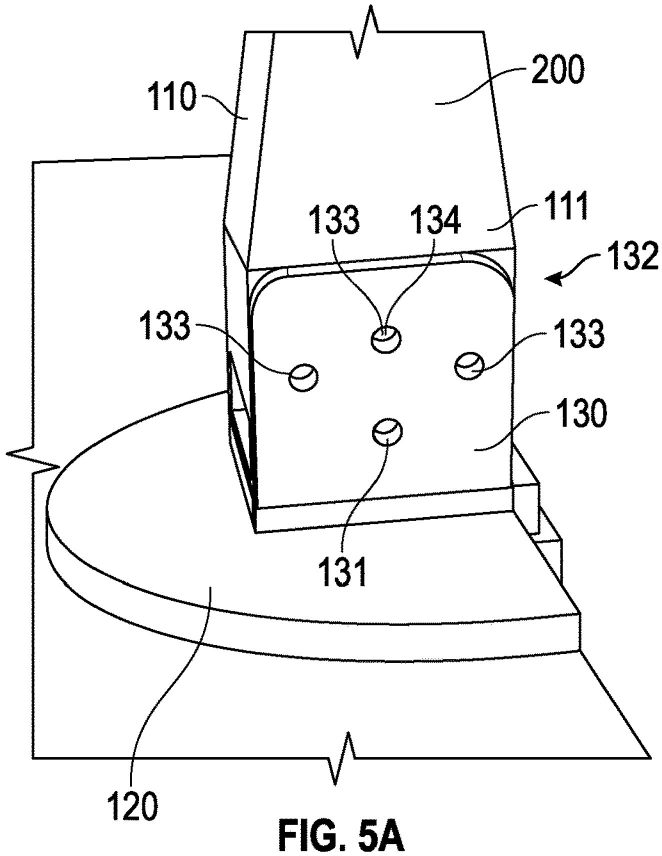
FIG. 5A shows an enlarged view of a first pivot bracket of the elevated pet resting apparatus according to the first illustrated embodiment.

FIG. 5A shows an enlarged view of the first pivot bracket (130) of the elevated pet resting apparatus (100) according to the first illustrated embodiment. The first pivot bracket comprises a first pivot axis (131) and a first adjustability mechanism (132). The first pivot axis is a point where the proximal end (111) of the rotatable arm (110) rotates about. The first adjustability mechanism allows for locked positions at different angles to provide customizability of the rotatable arm relative to the table. In some embodiments, first pivot bracket comprises angle increments, each corresponding to thirty-degree intervals. Other degree increments can also be utilized. The first adjustability mechanism comprises a first plurality of position apertures (133) with a removable or retractable fastener for selecting a desired position. Other adjustability mechanisms can also be utilized including, and without limitation, a slot. As shown, the first plurality of position apertures comprises three apertures including a first middle aperture (134) and two corresponding side apertures forming an arch, wherein the first middle aperture is positioned higher than the two corresponding side apertures. The first middle aperture is utilized for the upright position. The side aperture disposed closer to the engaged edge is utilized for the outward angled position. The side aperture disposed further from the engaged edge is utilized for the inward angled position. Other numbers of apertures and mechanical designs for providing the adjustability can also be utilized.

Figure 5B:
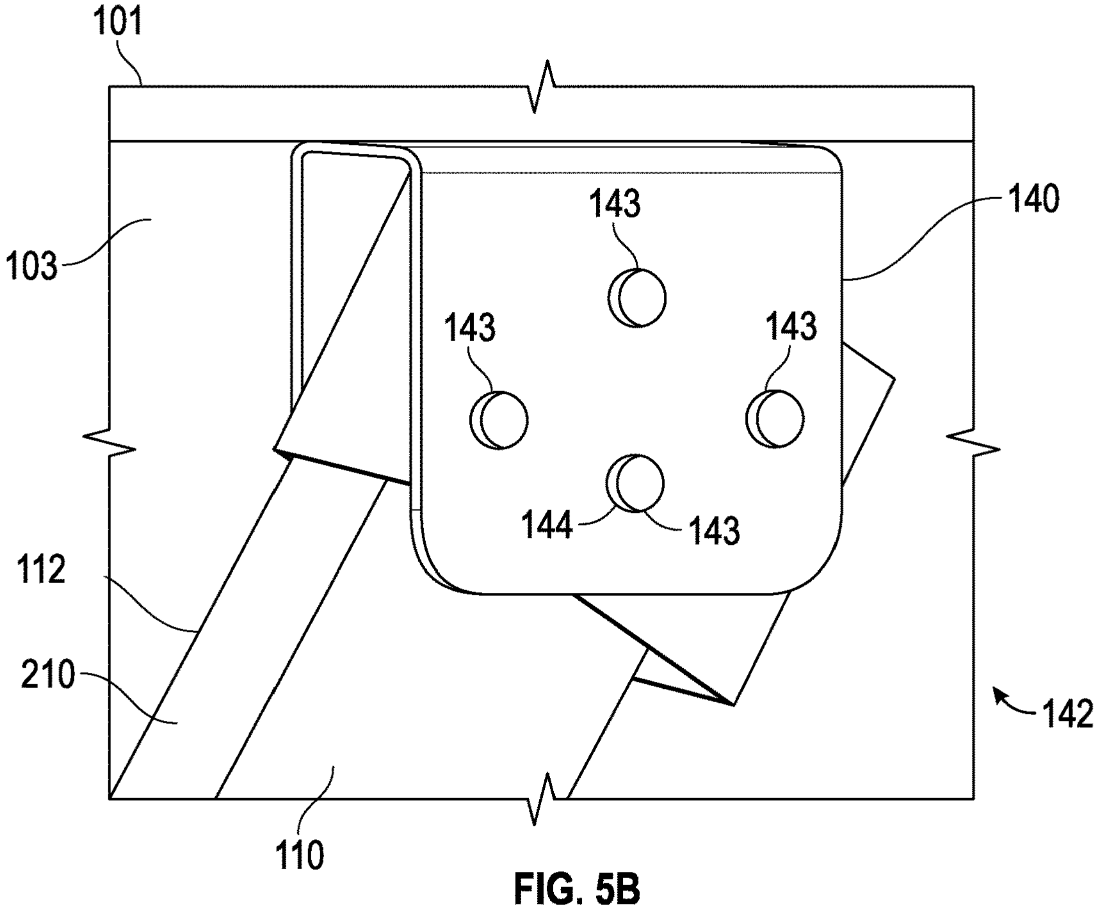
FIG. 5B shows an enlarged view of a second pivot bracket of the elevated pet resting apparatus according to the first illustrated embodiment.

FIG. 5B shows an enlarged view of the second pivot bracket (140) of the elevated pet resting apparatus (100) according to the first illustrated embodiment. The second pivot bracket comprises a second pivot axis (141) and a second adjustability mechanism (142). The second pivot axis is a point where the distal end (112) of the rotatable arm (110) rotates about. The second adjustability mechanism allows for locked positions at different angles to provide customizability of the rotatable arm relative to the nest platform (101). As shown, the second adjustability mechanism comprises a second plurality of position apertures (143) with a removable or retractable fastener for selecting a desired position. Other adjustability mechanisms can also be utilized including, and without limitation, a slot. As shown, the second plurality of position apertures comprises three apertures including a second middle aperture (144) and two corresponding side apertures forming an arch wherein the second middle aperture is disposed lower than the two corresponding side apertures. The second middle aperture is configured to maintain the nest platform in an orientation orthogonal to the rotatable arm. The side apertures are individually utilized to provide an angled configuration between the nest platform and the rotatable arm. Other number of apertures and mechanical designs for providing the adjustability can also be utilized. In some embodiments, the second pivot bracket comprises a same increment angle as the first pivot bracket.

Generally, the second pivot bracket (140) and the first pivot bracket (130) rotate about a same axis of rotation. Generally, the first plurality of position apertures (133) comprises a number of apertures equal to the second plurality of position apertures (143). This allows for equal and opposite rotations at the proximal end (111) and distal end (112) for preserving a level orientation of the nest platform (101) relative to the ground surface.

Figure 6:
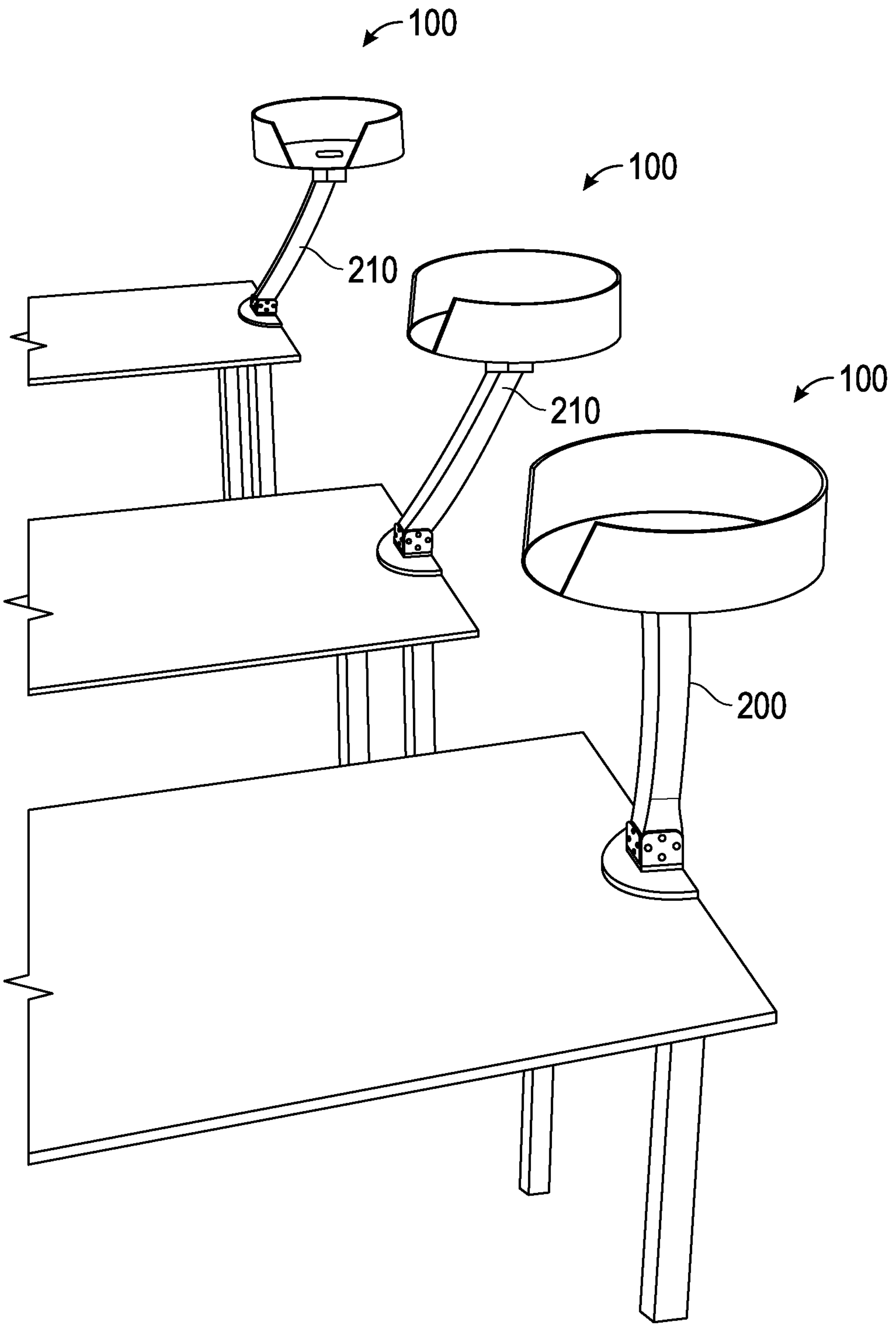
FIG. 6 shows various elevated pet resting apparatuses in different positions.

FIG. 6 shows various elevated pet resting apparatuses (100) in different positions. The positions can include the upright position (200), the outward angle position (210), and the inward angled position (not shown). Adjustability mechanisms having a finite number of position apertures will subsequently have a finite number of positions equal to the number of position apertures. As illustrated herein, position apertures equaling three renders three rotatable arm positions, namely the upright position, the inward angled position, and the outward angle position. One having skill in the art will appreciate that the elevated pet resting apparatus can hold a greater weight at the upright position than at the angled positions with the load-bearing capabilities decreasing as the rotatable arm moves further from the upright position in either direction.

Figure 7:
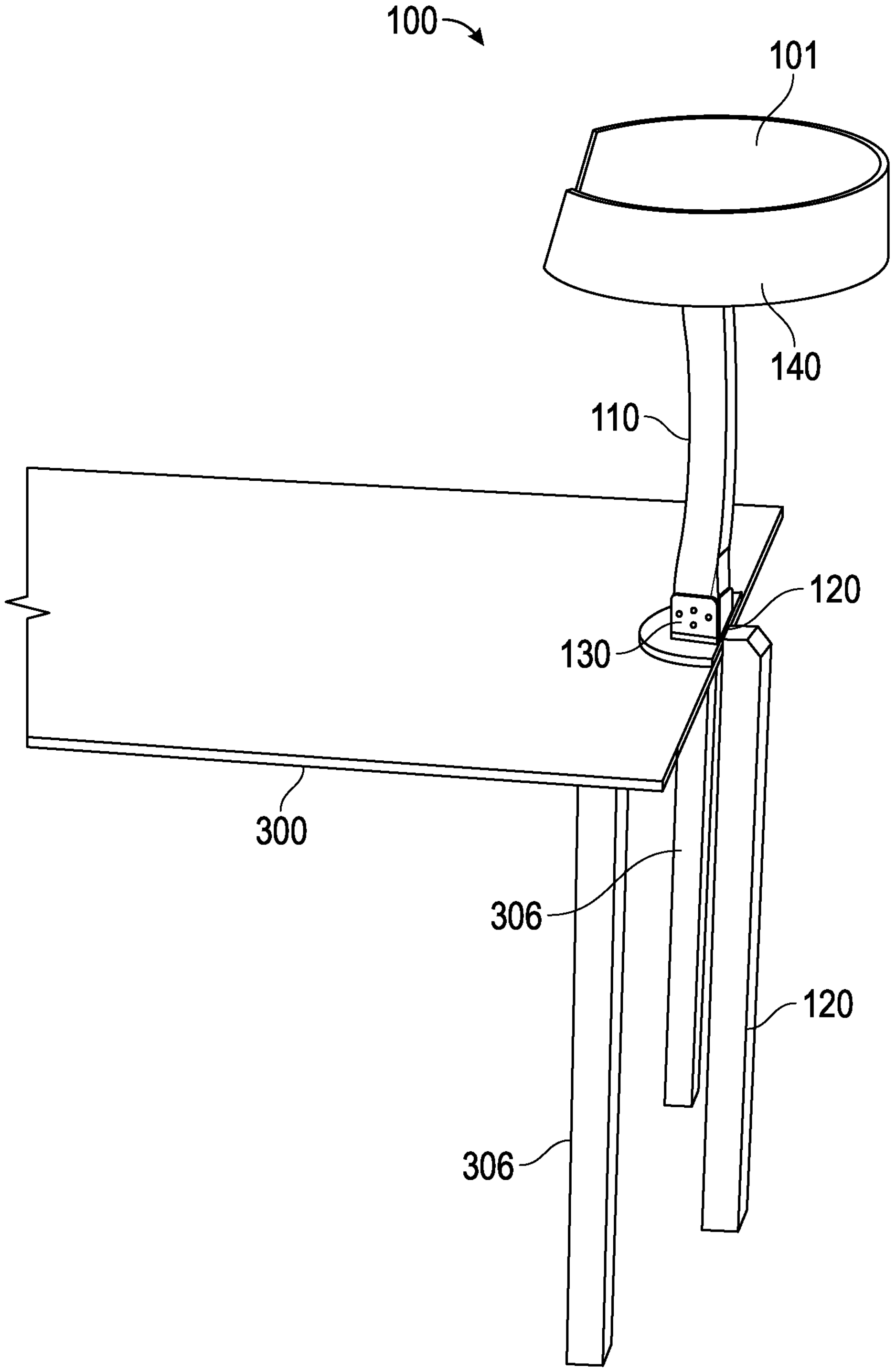
FIG. 7 shows a perspective view of the elevated pet resting apparatus in accordance with a second illustrated embodiment.
Figure 8:
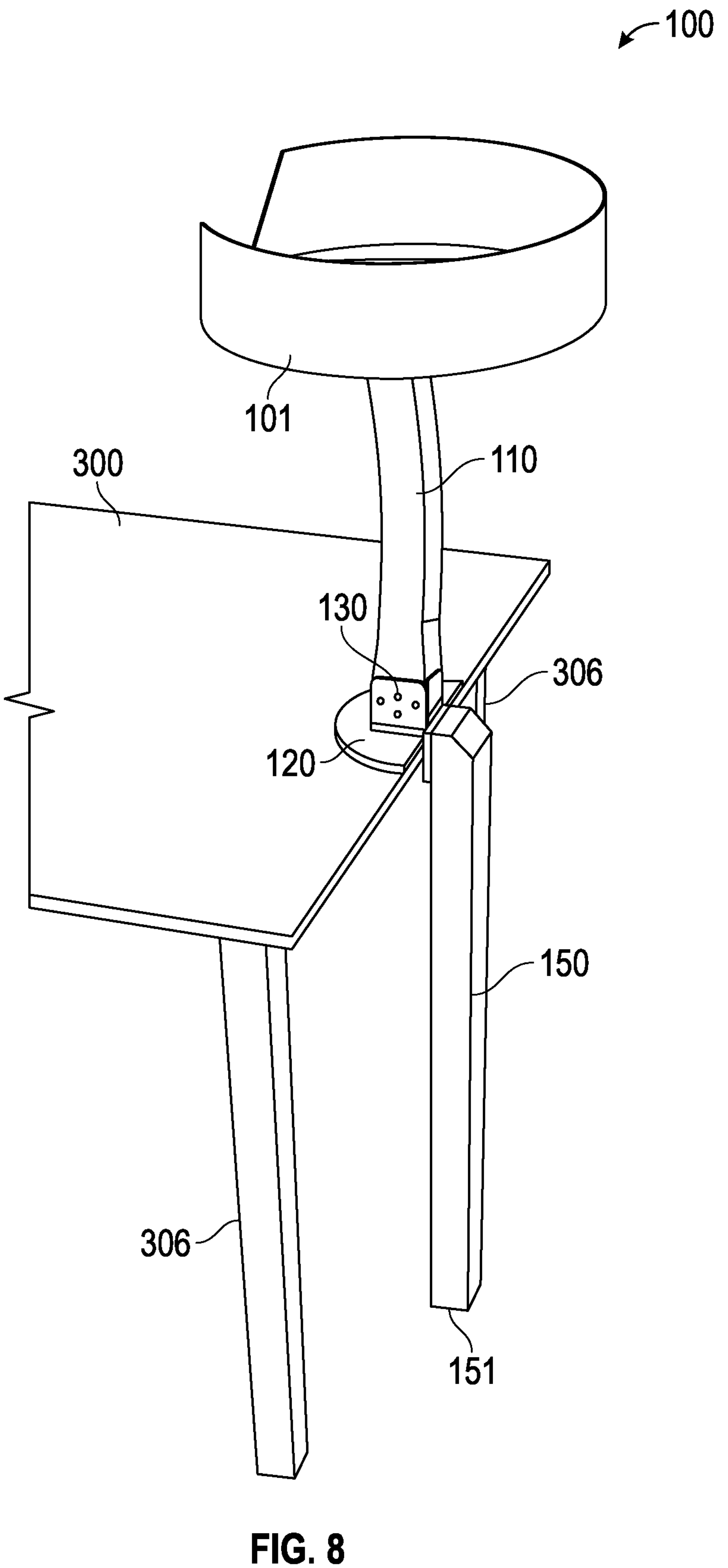
FIG. 8 shows an enlarged view of the elevated pet resting apparatus according to the second illustrated embodiment.
Figure 9:
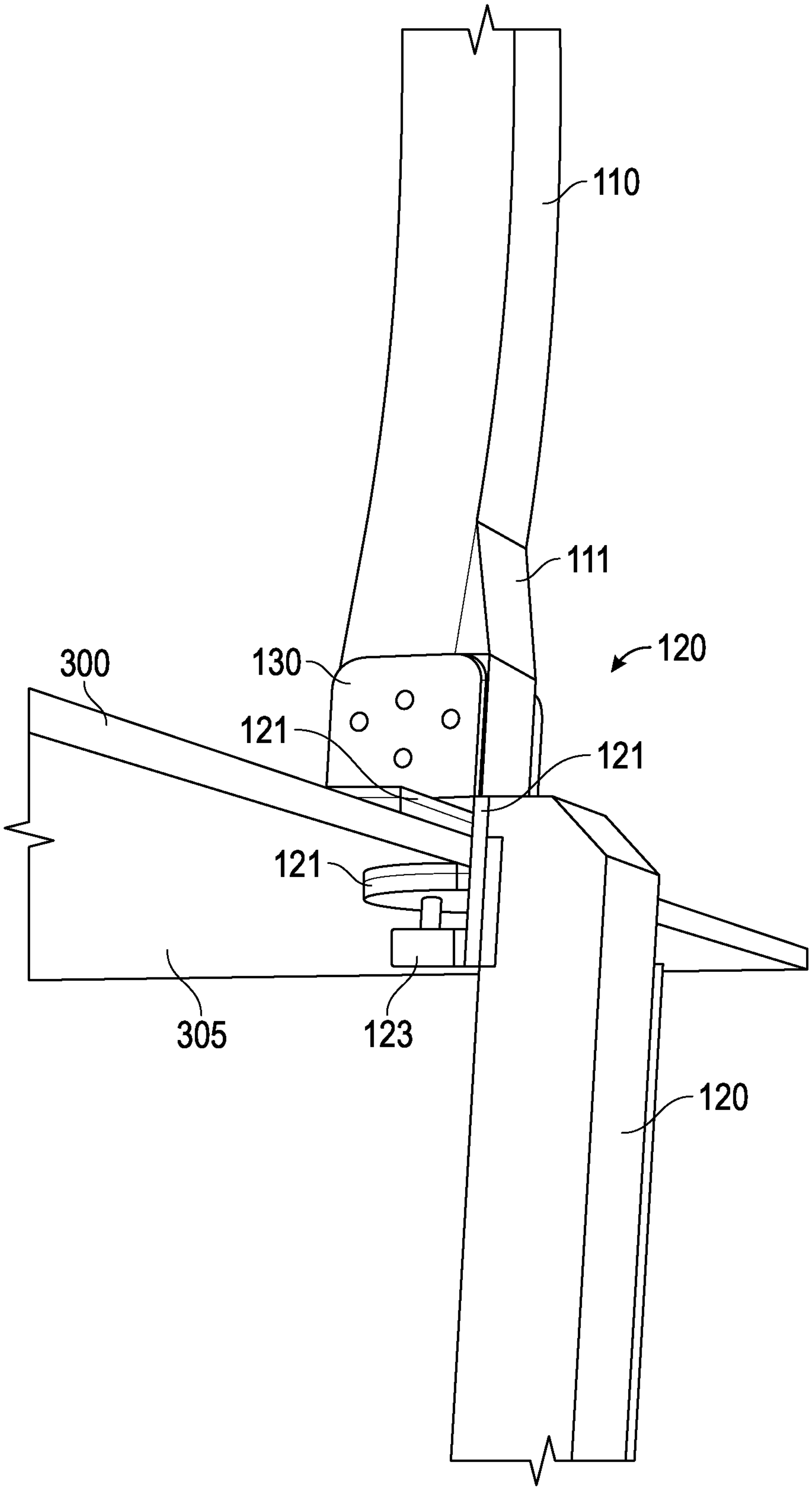
FIG. 9 shows a support post of the elevated pet resting apparatus according to the second illustrated embodiment.

FIG. 7-9 show an elevated pet resting apparatus (100) in accordance with a second illustrated embodiment. The elevated pet resting apparatus comprises a rotatable arm (110) coupled to a table (300) by a clamping mechanism (120) at a proximal end (111). A distal end (112) of the rotatable arm opposite the proximal end is coupled to a nest platform (101). The rotatable arm allows the nest platform to be disposed at a higher elevation than the table. Height of elevation of the nest platform is dependent on the position and angle of the rotatable arm relative to the table. The rotatable arm is configured to rotate about the table via a first pivot bracket (130). The first pivot bracket is configured to move the nest platform away and towards an opposite end of the table. The nest platform is configured to rotate about the rotatable arm via a second pivot bracket (140). The second pivot bracket allows the nest platform to maintain a level orientation with a ground surface.

The elevated pet resting apparatus (100) further comprises a support post (150) coupled to the elevated pet resting apparatus at the clamping mechanism (120). The support post can provide additional support to the table (300) when excess weight caused by the elevated pet resting apparatus and a corresponding pet are greater than the designed load bearing capacity of the table. The support post extends downward toward the ground surface in parallel alignment with a plurality of legs (306) of the table. A terminating end of the support post may comprise an adjustable foot (151) to accommodate various sized tables.

Each of the components of the elevated pet resting apparatus described herein may be manufactured and/or assembled in accordance with the conventional knowledge and level of a person having skill in the art. The apparatus may comprise wood, metal, thermoplastics, a combination thereof, and/or other materials for manufacturing.

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

FEATURE LIST elevated pet resting apparatus (100)
nest platform (101)
raised perimeter (102)
bottom side (103)
rotatable arm (110)
proximal end (111)
distal end (112)
clamping mechanism (120)
clamping bracket (121)
clamping spacer (122)
clamping screw (123)
first pivot bracket (130)
first pivot axis (131)
first adjustability mechanism (132)
first plurality of position apertures (133)
first middle position aperture (134)
second pivot bracket (140)
second pivot axis (141)
second adjustability mechanism (142)
second plurality of position apertures (143)
second middle position aperture (144)
support post (150)
adjustable foot (151)
upright position (200)
outward angled position (210)
inward angled position (220)
table (300)
tabletop (301)
longitudinal side (302)
lateral side (303)
top surface (304)
bottom surface (305)
plurality of legs (306)
engaged edge (307)
longitudinal axis (400)
lateral axis (410)
vertical axis (420)

What is claimed is:

1. An elevated pet resting apparatus configured to attach to a table, comprising:

a rotatable arm comprising a proximal end and a distal end opposite the proximal end;

a clamping mechanism disposed at the proximal end of the rotatable arm, the rotatable arm rotatably coupled to the clamping mechanism at a first pivot axis, the clamping mechanism configured to couple to an edge of the table at a top surface and a bottom surface thereof;

a nest platform disposed at the distal end, the nest platform rotatably coupled to the rotatable arm at a second pivot axis, the nest platform further comprising a raised perimeter extending at least partially around a periphery of the nest platform;

a first adjustability mechanism disposed at the first pivot axis, the first adjustability mechanism configured to adjust an angle between the rotatable arm and the clamping mechanism, the first adjustability mechanism further comprising a first pivot bracket, the first pivot bracket rotatably coupled to the rotatable arm and fixedly coupled to the clamping mechanism wherein the first pivot bracket comprises the first pivot axis; and a second adjustability mechanism disposed at the second pivot axis, the second adjustability mechanism configured to adjust an angle between the rotatable arm and the nest platform, the second adjustability mechanism further comprising a second pivot bracket, the second pivot bracket rotatably coupled to the rotatable arm and fixedly coupled to the nest platform wherein the second pivot bracket comprises the second pivot axis;

wherein the first pivot axis and the second pivot axis comprise a same axis of rotation, and the second adjustability mechanism is configured to counteract the first adjustability mechanism such that the nest platform maintains a level orientation relative to the top surface of the table, and further wherein the second pivot bracket comprises a single axis of rotation such that the nesting platform is permitted to rotate only in one axis of rotation relative to the rotatable arm.

2. The elevated pet resting apparatus of claim 1, wherein the elevated pet resting apparatus is configurable in a plurality of positions, the plurality of positions comprising:

an upright position wherein the rotatable arm is orthogonal to the top surface of the table;

an outward angled position wherein at least a portion of the nest platform overhangs the table; and an inward angled position wherein the nest platform is positioned above the table.

3. The elevated pet resting apparatus of claim 2, wherein in each of the plurality of positions, the nest platform maintains the level orientation relative the top surface of the table.

4. The elevated pet resting apparatus of claim 1, wherein the first pivot axis is parallel to the second pivot axis.

5. The elevated pet resting apparatus of claim 1, the clamping mechanism further comprising a support post coupled to the clamping mechanism, the support post configured to extend downward to a terminating end, the terminating end configured to contact a ground surface below the table.

6. The elevated pet resting apparatus of claim 1, wherein the first pivot bracket comprises a single axis of rotation such that the rotatable arm is permitted to rotate only in one axis of rotation relative to the edge of the table.

7. The elevated pet resting apparatus of claim 1, wherein the raised perimeter extends without discontinuity around the periphery from a first end to a second end, the first end and the second end of the raised perimeter being disconnected to form a single entryway disposed on the nesting platform, wherein the single entryway is aligned with rotatable arm such that the single entryway is configured to be disposed directly above a portion of the rotatable arm.

8. The elevated pet resting apparatus of claim 1, wherein the raised perimeter extends without discontinuity around the periphery from a first end to a second end, the first end and the second end of the raised perimeter being disconnected to form a single entryway disposed on the nesting platform, wherein the single entryway is aligned with rotatable arm such that the single entryway is configured to be disposed directly above a portion of the rotatable arm.

9. An elevated pet resting apparatus configured to attach to a table, comprising:

a rotatable arm comprising a proximal end and a distal end opposite the proximal end;

a clamping mechanism disposed at the proximal end of the rotatable arm, the rotatable arm rotatably coupled to the clamping mechanism at a first pivot axis, the clamping mechanism configured to couple to an edge of the table;

a nest platform disposed at the distal end, the nest platform rotatably coupled to the rotatable arm at a second pivot axis, the nest platform further comprising a raised perimeter extending at least partially around a periphery of the nest platform;

a first adjustability mechanism disposed at the first pivot axis, the first adjustability mechanism configured to adjust an angle between the rotatable arm and the clamping mechanism, the first adjustability mechanism further comprising a first pivot bracket, the first pivot bracket rotatably coupled to the rotatable arm and fixedly coupled to the clamping mechanism wherein the first pivot bracket comprises the first pivot axis; and a second adjustability mechanism disposed at the second pivot axis, the second adjustability mechanism configured to adjust an angle between the rotatable arm and the nest platform, the second adjustability mechanism further comprising a second pivot bracket, the second pivot bracket rotatably coupled to the rotatable arm and fixedly coupled to the nest platform wherein the second pivot bracket comprises the second pivot axis;

wherein the second adjustability mechanism is configured to counteract the first adjustability mechanism such that the nest platform maintains a level orientation relative to a top surface of the table, and further wherein the second pivot bracket comprises a single axis of rotation such that the nesting platform is permitted to rotate only in one axis of rotation relative to the rotatable arm.

10. The elevated pet resting apparatus of claim 9, wherein the clamping mechanism is configured to engage the top surface and a bottom surface of the table.

11. The elevated pet resting apparatus of claim 9, wherein the elevated pet resting apparatus is configurable in a plurality of positions, the plurality of positions comprising:

an upright position wherein the rotatable arm is orthogonal to the top surface of the table;

an outward angled position wherein at least a portion of the nest platform overhangs the table; and an inward angled position wherein the nest platform is positioned above the table.

12. The elevated pet resting apparatus of claim 11, wherein in each of the plurality of positions, the nest platform maintains the level orientation with the top surface of the table.

13. The elevated pet resting apparatus of claim 9, wherein the rotatable arm is configured to rotate perpendicular to the edge of the table.

14. The elevated pet resting apparatus of claim 9, wherein the first pivot axis and the second pivot axis comprise a same axis of rotation.

15. The elevated pet resting apparatus of claim 9, wherein the first pivot axis is parallel to the second pivot axis.

16. The elevated pet resting apparatus of claim 9, the clamping mechanism further comprising a support post coupled to the clamping mechanism, the support post configured to extend downward to a terminating end, the terminating end configured to contact a ground surface below the table.

17. The elevated pet resting apparatus of claim 16, wherein the support post is configured to be in parallel alignment with legs of the table.

18. The elevated pet resting apparatus of claim 16, the terminating end further comprising an adjustable foot.

19. The elevated pet resting apparatus of claim 9, wherein the first pivot bracket comprises a single axis of rotation such that the rotatable arm is permitted to rotate only in one axis of rotation relative to the edge of the table.

* * * * *